(12) United States Patent
Uehle et al.

(10) Patent No.: US 7,213,842 B2
(45) Date of Patent: May 8, 2007

(54) CONTROL HOUSING FOR WORK VEHICLE

(75) Inventors: Howard Thomas Uehle, Cedar Falls, IA (US); Adam Joe Shuttleworth, Denver, IA (US)

(73) Assignee: Deere & Company, Moline, IL (US)

( * ) Notice: Subject to any disclaimer, the term of this patent is extended or adjusted under 35 U.S.C. 154(b) by 396 days.

(21) Appl. No.: 10/967,473

(22) Filed: Oct. 18, 2004

(65) Prior Publication Data

US 2006/0082122 A1 Apr. 20, 2006

(51) Int. Cl.
*B62D 1/16* (2006.01)
(52) U.S. Cl. ...................................... 280/779
(58) Field of Classification Search ................ 280/750, 280/771, 775, 779; 180/90; 74/492, 493; 296/70, 74

See application file for complete search history.

(56) References Cited

U.S. PATENT DOCUMENTS

| | | | | |
|---|---|---|---|---|
| 4,086,825 A | * | 5/1978 | Badcock et al. | ............... 74/492 |
| 4,400,012 A | * | 8/1983 | Otsuka | ........................ 280/777 |
| 4,411,331 A | * | 10/1983 | Hanada | ...................... 180/78 |
| 4,598,562 A | * | 7/1986 | Freeman | ...................... 70/237 |
| 4,627,514 A | * | 12/1986 | Brown | ........................ 180/287 |
| 4,719,986 A | * | 1/1988 | Richardson, Jr. | ........... 180/287 |
| 4,781,268 A | * | 11/1988 | Richardson, Jr. | ........... 180/287 |
| 4,903,988 A | * | 2/1990 | Jambor et al. | ............... 280/771 |

(Continued)

*Primary Examiner*—Eric Culbreth
*Assistant Examiner*—Barry Gooden, Jr.

(57) ABSTRACT

An agricultural tractor or other work vehicle having an operator's station is described. A steering column assembly is mounted in the operator's station and has a steering shaft disposed in a steering shaft barrel. The steering column assembly is adapted to both tilt and telescope. A left hand forward-neutral-reverse lever is mounted in a housing. A key is mounted on the steering shaft barrel and a first housing half is journaled on the steering shaft by way of a bushing. The first housing half has a plurality of lever support bolsters and a plurality of fastener bosses. A second housing half is disposed on the steering shaft barrel and has a plurality of lever support bolsters, a keyway and a plurality of fastener bosses. One of the first or second housing halves has a groove around a peripheral edge thereof, the other of the first or second housing halves has a tongue around a peripheral edge thereof. Similarly, one of the first or second housing halves has a circular lip at an end of each fastener boss. The keyway of the second housing half engages the key mounted on the steering barrel so that the housing cannot rotate with respect thereto and the tongue of one housing half matingly engages the groove of the other housing half, while the circular lips of the fastener bosses of one housing half engage the fastener bosses of the other housing half. The left hand forward-neutral-reverse lever is sandwiched between the upper and lower housings and is supported therein by the lever support bolsters of both housing halves so that loads are transmitted from the left hand forward-neutral-reverse lever to the housing assembly and in turn to the steering column assembly. The control housing assembly is able to move with the steering shaft and steering wheel as the steering shaft and steering wheel are telescoped and tilted, but cannot rotate.

31 Claims, 10 Drawing Sheets

U.S. PATENT DOCUMENTS

| | | | |
|---|---|---|---|
| 5,067,747 A * | 11/1991 | Yokoyama | 280/777 |
| 5,197,315 A * | 3/1993 | Zagoroff | 70/417 |
| 5,280,956 A * | 1/1994 | Tanaka et al. | 280/777 |
| 5,461,891 A * | 10/1995 | Noel | 70/18 |
| 5,495,777 A * | 3/1996 | Schneider et al. | 74/492 |
| 5,573,273 A * | 11/1996 | Ito | 280/775 |
| 5,799,515 A * | 9/1998 | Floyd | 70/18 |
| 6,129,406 A * | 10/2000 | Dauvergne | 296/70 |
| 6,578,449 B1 * | 6/2003 | Anspaugh et al. | 74/606 R |
| 6,886,860 B2 * | 5/2005 | Singleton et al. | 280/779 |
| 7,000,949 B2 * | 2/2006 | Bostic et al. | 280/779 |
| 7,077,431 B2 * | 7/2006 | Gayer et al. | 280/775 |
| 7,077,434 B2 * | 7/2006 | Lee | 280/779 |
| RE39,440 E * | 12/2006 | Anspaugh et al. | 74/606 R |
| 2002/0195810 A1* | 12/2002 | Ketzer et al. | 280/779 |
| 2004/0031633 A1* | 2/2004 | Singleton et al. | 180/90 |
| 2004/0129098 A1* | 7/2004 | Gayer et al. | 74/18 |
| 2005/0028635 A1* | 2/2005 | Onoda et al. | 74/492 |

* cited by examiner

CONTROL HOUSING FOR WORK VEHICLE

FIELD OF THE INVENTION

The present invention relates generally to work vehicles such as agricultural tractors. More particularly, the present invention relates to operator controls within the operator's stations of such vehicles. Specifically, the present invention relates to housings for such operator controls.

BACKGROUND OF THE INVENTION

The problem is that there is a need for a housing that encloses and holds a control lever such as the electronic power reverser control for an agriculture tractor. This housing must withstand loads applied to the lever as well as be aesthetically pleasing. It is desirable to do this with as few parts are possible.

Any tractor or other work vehicle that has an electronic power reverser will have a lever/switch that controls the forward/rearward motion of the vehicle. Of the known power reverser housings, none use a composite material to form both the aesthetic housing as well as the structural functions.

SUMMARY OF THE INVENTION

The present invention has upper and lower housings that together retain the control lever. These two housing halves are fastened together with a plurality of fasteners, and other joining techniques. The lever is retained between the two housing halves without additional fasteners. More particularly, the lever is "sandwiched" between the two housing halves. As the lever has a load applied to it, the load is transmitted to the housing halves which, in turn, transmit the load to the steering column. The housing halves slide on the steering column allowing the steering column to telescope while maintaining a constant distance from the steering wheel to the reverser lever. There is also bushing means that prevents the housing from wearing prematurely as the steering wheel is turned. This differs from the known prior art in that the electronic power reverser is housed between two composite parts that provide both the aesthetic and structural functions. The benefit is that the disclosed system that has fewer parts, is lower cost, and is easier to assemble than previously known structures. This design is more fully integrated and has less opportunity for failure than known structures.

The problem of fastening the upper and lower housing with a system that transfers load from the operator to the lever, from the lever to the housing, and from the housing to the steering column, is overcome by using a plurality of fasteners, a tongue and groove configuration around the perimeter and an interlock feature on the bosses for the fasteners. There are also contact areas that serve to "sandwich" the lever in the housing.

In view of the foregoing, it is an object of the invention to provide a housing for a control lever assembly.

Another object of the invention is the provision of a housing for a control lever assembly that transfers loads from the operator to the lever, from the lever to the housing, and from the housing to the steering column.

A further object of the invention is to provide a housing for a control lever assembly that functions both aesthetically and structurally.

An additional object of the invention is the provision of a housing for a control lever assembly that requires fewer parts, is lower in cost and is easier to assemble than previously known housings.

The foregoing and other objects of the invention together with the advantages thereof over the known art which will become apparent from the detailed specification which follows are attained by an operator control housing for a work vehicle, the vehicle being equipped with a control lever and a steering column assembly, the steering column assembly having a steering shaft disposed in a steering shaft barrel and a steering wheel attached to the steering shaft, the control housing assembly comprising: a key mounted on the steering shaft barrel; a first housing half journaled on the steering shaft by way of bushing means and being retained thereon by at least one retaining means, the first housing half having a plurality of lever support bolsters and a plurality of fastener bosses; a second housing half disposed on the steering shaft barrel, the second housing half having a plurality of lever support bolsters, a keyway and a plurality of fastener bosses; one of the first or second housing halves having a groove around a peripheral edge thereof, the other of the first or second housing halves having a tongue around a peripheral edge thereof; one of the first or second housing halves having a circular lip at an end of each fastener boss; and, wherein the keyway of the second housing half engages the key mounted on the steering barrel so that the housing cannot rotate with respect thereto and the tongue of one housing half matingly engages the groove of the other housing half, the circular lips of the fastener bosses of one housing half engage the fastener bosses of the other housing half, the control lever is sandwiched between the first and second housing halves and is supported therein by the lever support bolsters of both housing halves so that loads are transmitted from the control lever to the housing assembly and in turn to the steering column assembly, the control housing assembly is able to move with the steering shaft and steering wheel but cannot rotate.

Other objects of the invention are attained by an agricultural tractor having an operator's station, a steering column assembly mounted in the operator's station, the steering column assembly having a steering shaft disposed in a steering shaft barrel and a steering wheel attached to the steering shaft, the steering column assembly being adapted to both tilt and telescope, the tractor being further equipped with a left hand forward-neutral-reverse lever for controlling the forward and reverse motion of the tractor, the tractor further comprising: a key mounted on the steering shaft barrel; a first housing half journaled on the steering shaft by way of a bushing and being retained thereon by at least one retaining ring, the first housing half having a plurality of lever support bolsters and a plurality of fastener bosses; a second housing half disposed on the steering shaft barrel, the second housing half having a plurality of lever support bolsters, a keyway and a plurality of fastener bosses; one of the first or second housing halves having a groove around a peripheral edge thereof, the other of the first or second housing halves having a tongue around a peripheral edge thereof; one of the first or second housing halves having a circular lip at an end of each fastener boss; and, wherein the keyway of the second housing half engages the key mounted on the steering barrel so that the housing cannot rotate with respect thereto and the tongue of one housing half matingly engages the groove of the other housing half, the circular lips of the fastener bosses of one housing half engage the fastener bosses of the other housing half, the left hand forward-neutral-reverse lever is sandwiched between the upper and lower housings and is supported therein by the lever support bolsters of both housing halves so that loads are transmitted from the left hand forward-neutral-reverse lever to the housing assembly and in turn to the steering column assembly, the control housing assembly is able to move with the steering shaft and steering wheel as the steering shaft and steering wheel are telescoped and tilted but cannot rotate.

In general, an agricultural tractor or other work vehicle having an operator's station is described. A steering column assembly is mounted in the operator's station and has a steering shaft disposed in a steering shaft barrel. The steering column assembly is adapted to both tilt and telescope. A left hand forward-neutral-reverse lever is mounted in a housing. A key is mounted on the steering shaft barrel and a first housing half is journaled on the steering shaft by way of a bushing. The first housing half has a plurality of lever support bolsters and a plurality of fastener bosses. A second housing half is disposed on the steering shaft barrel and has a plurality of lever support bolsters, a keyway and a plurality of fastener bosses. One of the first or second housing halves has a groove around a peripheral edge thereof, the other of the first or second housing halves has a tongue around a peripheral edge thereof. Similarly, one of the first or second housing halves has a circular lip at an end of each fastener boss. The keyway of the second housing half engages the key mounted on the steering barrel so that the housing cannot rotate with respect thereto and the tongue of one housing half matingly engages the groove of the other housing half, while the circular lips of the fastener bosses of one housing half engage the fastener bosses of the other housing half. The left hand forward-neutral-reverse lever is sandwiched between the upper and lower housings and is supported therein by the lever support bolsters of both housing halves so that loads are transmitted from the left hand forward-neutral-reverse lever to the housing assembly and in turn to the steering column assembly. The control housing assembly is able to move with the steering shaft and steering wheel as the steering shaft and steering wheel are telescoped and tilted, but cannot rotate.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
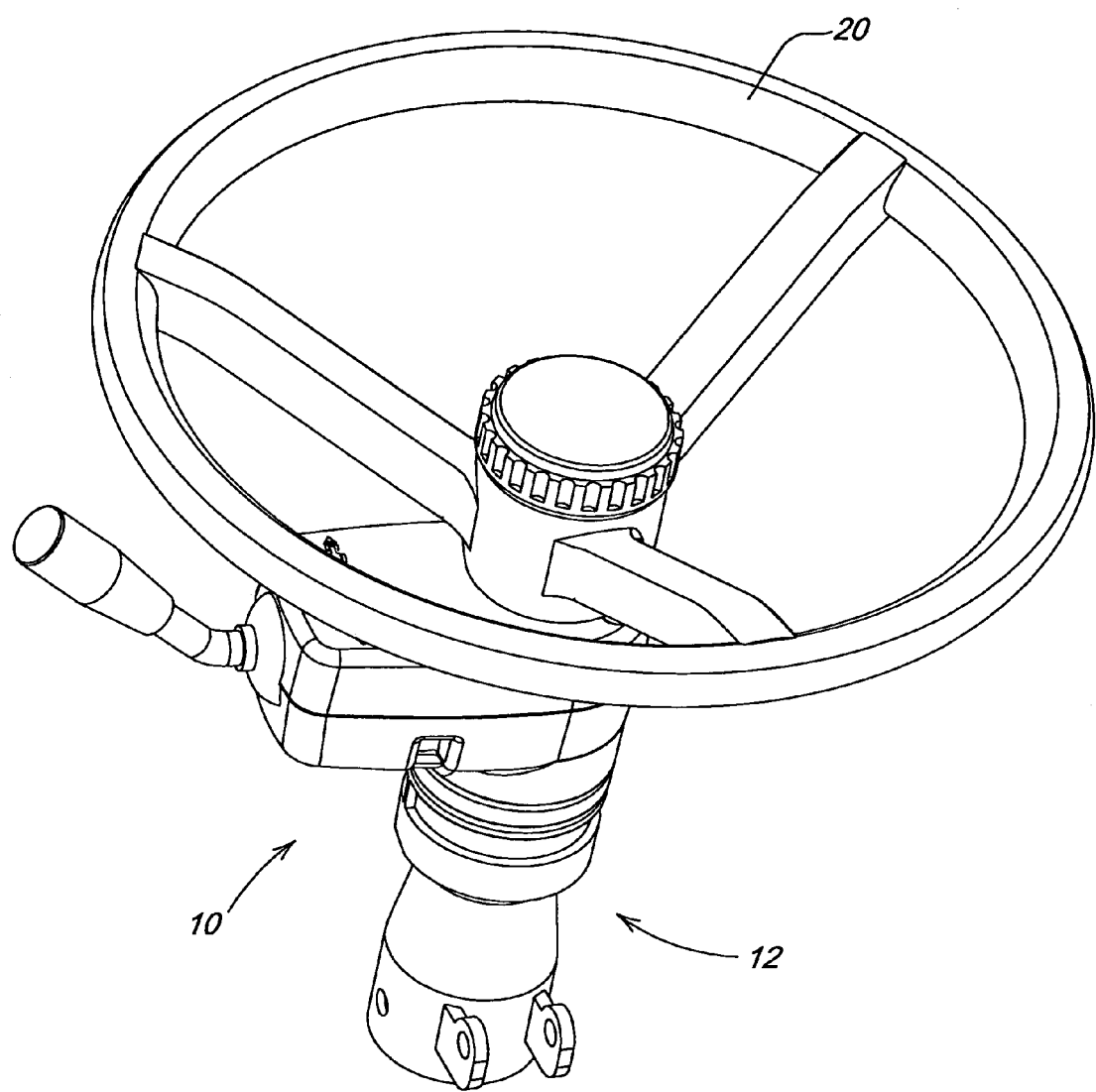
FIG. 1 is a perspective view of a vehicle steering column assembly having the control housing of the present invention.
Figure 2:
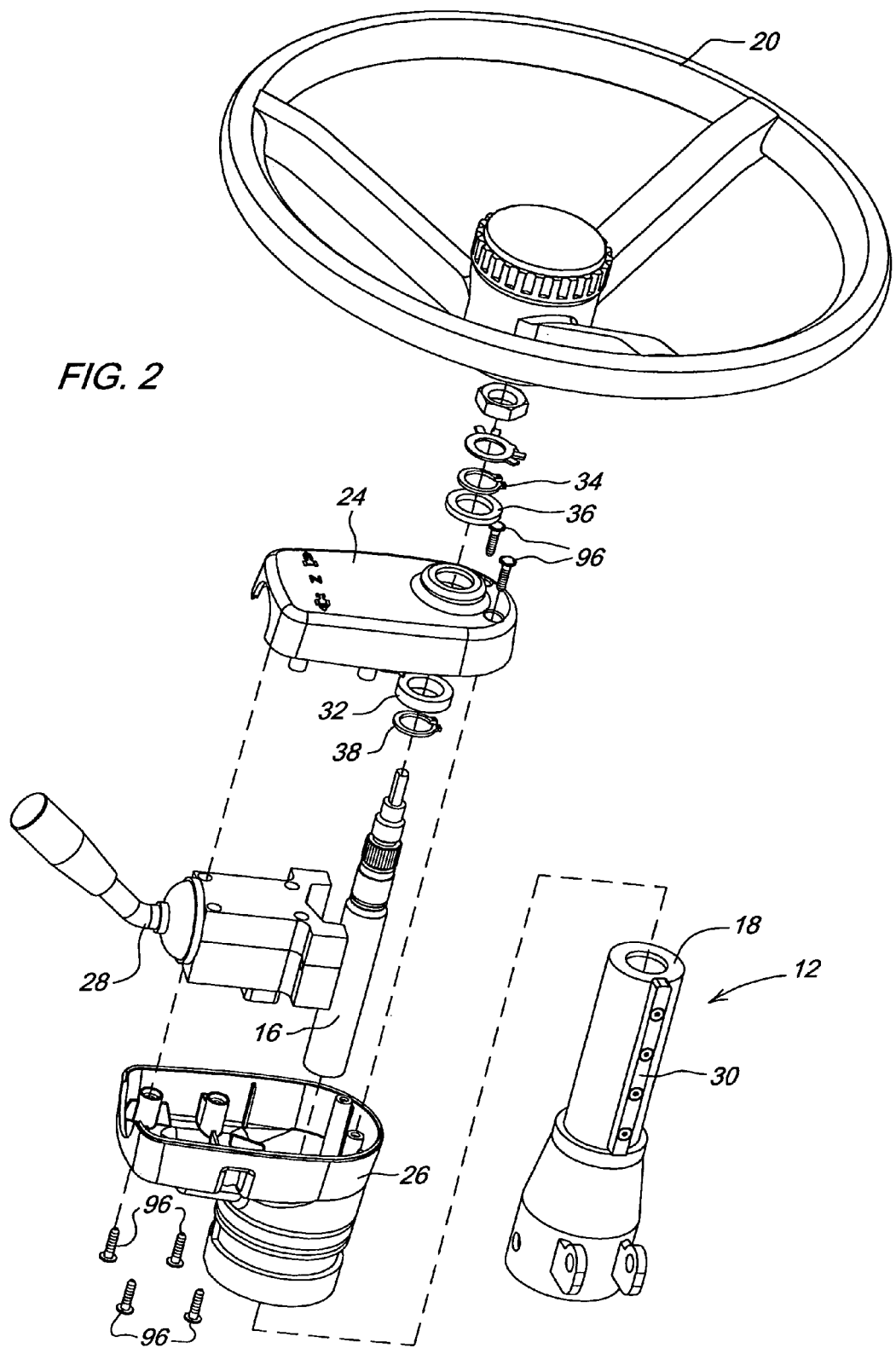
FIG. 2 is an exploded perspective view of the steering column assembly of FIG. 1.

With reference now to the drawings it can be seen that an operator control housing assembly according to the invention is designated generally by the numeral 10. As shown in FIGS. 1 and 2 the control housing 10 is adapted for mounting on a steering control assembly 12 in an operator's station of a vehicle. The steering control assembly 12 generally includes a steering column comprised of a steering shaft 16 and a steering shaft barrel 18. A steering wheel 20 is mounted to the steering shaft 16. The steering control assembly 12 is operatively connected, in a conventional manner, with a steering linkage of the vehicle (not shown). In the preferred embodiment the steering control assembly 12 is further adapted so that the steering shaft 16 is slidable with respect to the steering barrel 18 so that the steering column and wheel 20 are able to be telescoped. The steering column is also adapted to tilt, as well as telescope, to facilitate entry and egress from the operator station and to maximize operator comfort during operation of the vehicle. Those having skill in the art will recognize that the invention is equally applicable to steering control assemblies that do not tilt and/or telescope.

As shown in FIG. 2, the control housing 10 generally comprises an upper housing half 24 and a lower housing half 26. In the preferred embodiment the control housing assembly 10 houses a left hand forward/neutral/reverse (LH FNR) lever 28 which controls the forward, neutral, and reverse functions on the vehicle. Those having skill in the art will recognize that the invention is applicable to a number of other control levers, knobs or switches and is further applicable to left hand or right hand configurations. The control housing assembly 10 is assembled over the steering column and engages a key 30 on the steering shaft barrel 18. As will be described in more detail as the description continues, the key 30 interacts with the control housing assembly 10 to prevent relative rotation between the control housing assembly 10 and the steering column assembly. The control housing assembly 10 is further adapted to slide up and down on the steering column when the steering wheel 20 and column assembly are telescoped up and down. Bushing means 32 is installed into the upper housing 24 and contacts the steering shaft 16. In the preferred embodiment illustrated the bushing means is a metal bushing, but it will be recognized that the bushing means 32 could be of another type such as a bearing or wear ring and could be manufactured from any number of appropriate materials.

As shown in FIG. 2, an upper retaining clip 34 and washer 36 keep the control housing assembly 10 from sliding off the steering shaft 16. The bushing 32 is pressed into the upper housing 24 to prevent the bushing 32 from rotating in the housing 24. The bushing 32 contacts the upper housing 24 and allows the steering shaft 16 to rotate, while the control housing assembly 10 does not rotate. A lower retaining clip 38 keeps the control housing assembly 10 from falling down the steering column. The upper housing 24 is fixed from moving left, right, fore and aft by the bushing 32 and steering column combination. It should be noted that other appropriate retaining means can be used in place of the retaining clips 34 and 38 such as locking nuts, keys or pins etc.

Figure 3:
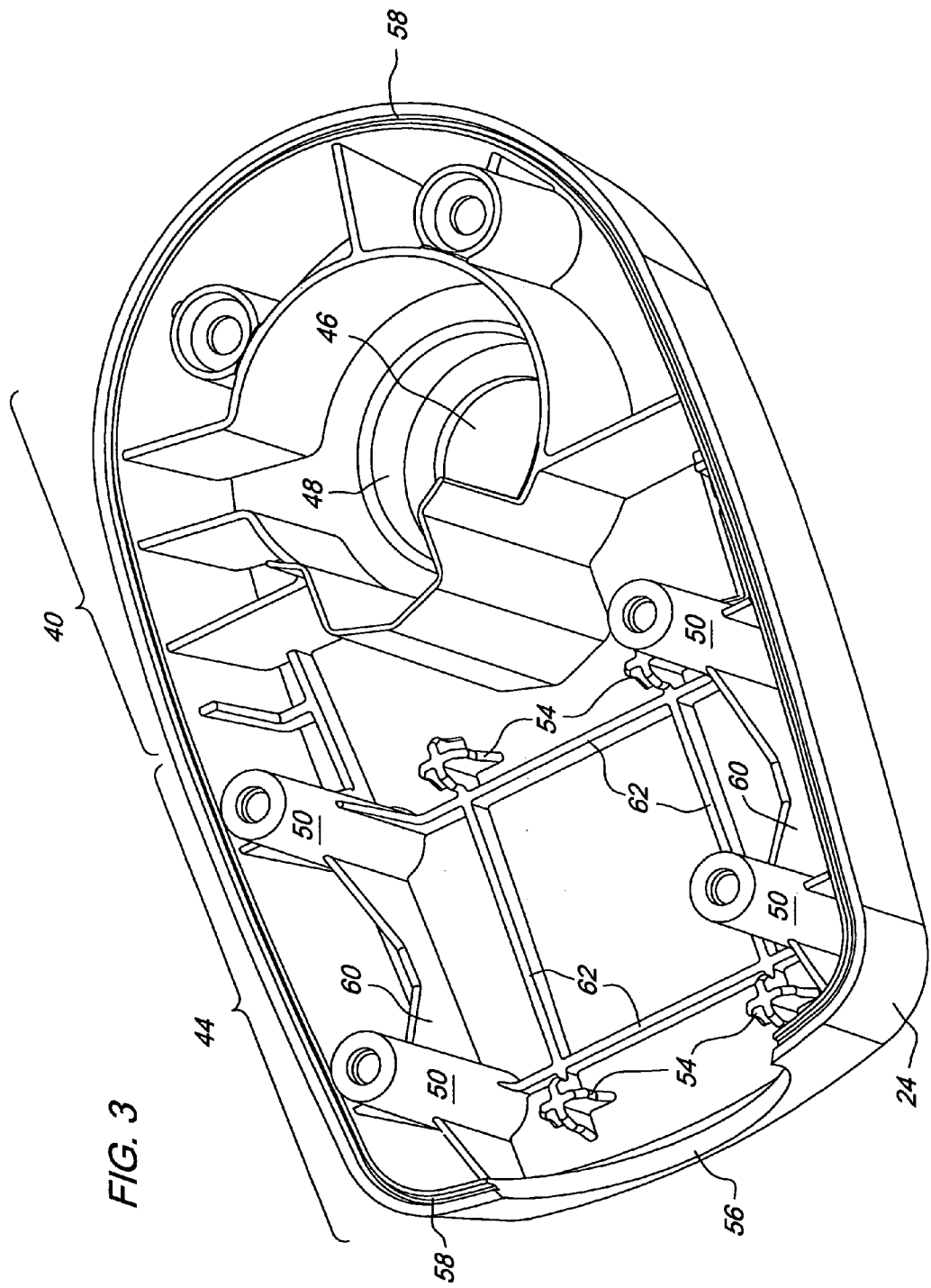
FIG. 3 is a bottom perspective view of the upper housing of the invention.

FIG. 3 illustrates the configuration of the upper housing 24. As can be seen the upper housing 24 generally includes a column mounting portion 40 and a lever mounting portion 44. The column mounting portion 40 includes a shaft aperture 46 and a bushing journal 48 surrounding the aperture 46. As described above the bushing 32 is pressed into the bushing journal 48. The lever mounting portion 44 of the upper housing 24 generally includes a plurality of fastener bosses 50 and a plurality of lever assembly bolsters 54. A recess 56 is provided in one end of the upper housing 24 through which the LH FNR lever 28 extends when the housings 24 and 26 are assembled as will be described in more detail below. For reasons which will become apparent as the description continues, a groove 58 is provided around the periphery of the upper housing 24. Support webs 60 are provided between the fastener bosses 50 for additional structural integrity. Similarly, ridges 62 are provided between the bolsters 54 for support of the LH FNR lever 28 and for additional structural support.

Figure 4:
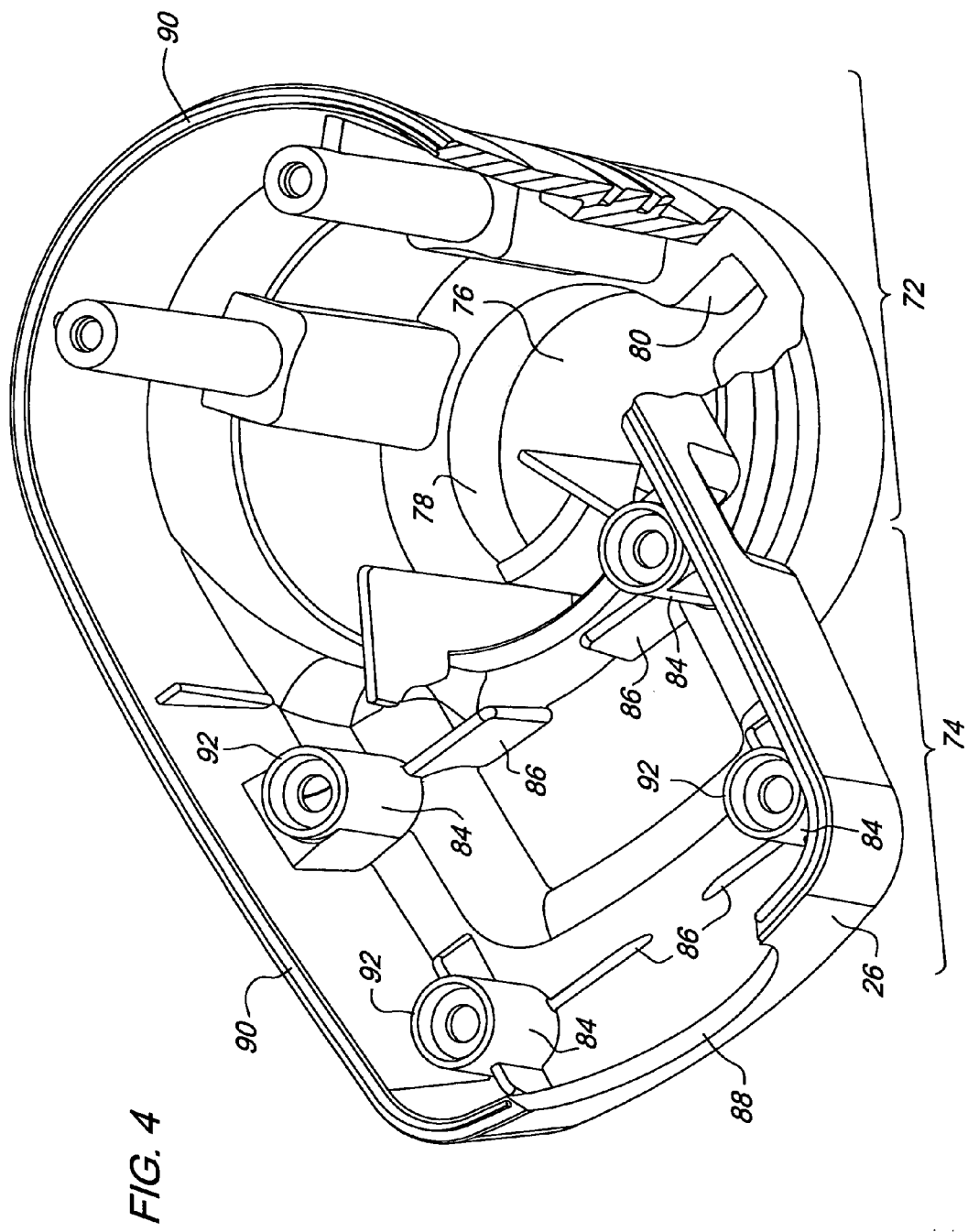
FIG. 4 is a top perspective view of the lower housing of the invention.
Figure 8:
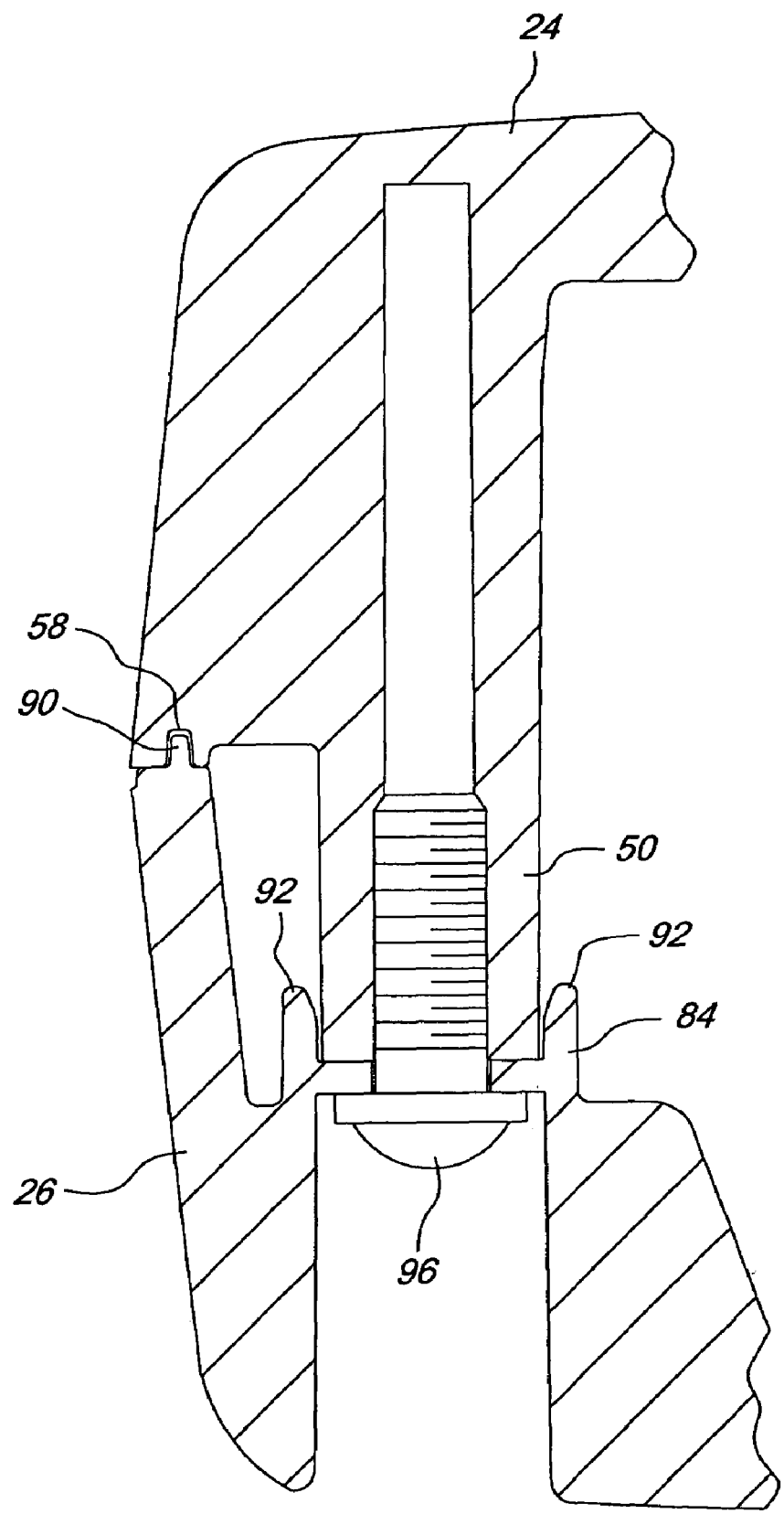
FIG. 8 is a cross-sectional view of the control housing assembly taken along the line 8—8 of FIG. 6.

FIG. 4 illustrates the configuration of the lower housing 26. Like the upper housing 24, the lower housing 26 generally includes a column mounting portion 72 and a lever mounting portion 74. The column mounting portion 72 includes a shaft aperture 76 surrounded by a steering barrel journal 78. For reasons which will be described below, the steering barrel journal 78 includes a keyway 80. The lever mounting portion 74 includes a plurality of fastener bosses 84 and a plurality of lever assembly bolsters 86. A recess 88 is provided in one end of the lower housing 26 through which the LH FNR lever 28 extends when the housings 24 and 26 are assembled. A tongue 90 is provided around the periphery of the lower housing 26. The tongue 90 is adapted to matingly engage the groove 58 of the upper housing 24. FIG. 8 illustrates the tongue and groove mating of the upper 24 and lower 26 housings. FIG. 8 also illustrates the interaction of the fastener bosses 50 of the upper housing 24 with the fastener bosses 84 of the lower housing 26. As shown the fastener bosses 84 of the lower housing 26 each include an interlock feature. The interlock feature comprises a generally circular lip 92 extending upward at the top of each fastener boss 84 of the lower housing 26. The inside diameter of the circular lip 92 closely corresponds to the outside diameter of the generally tubular fastener boss 50 of the upper housing 24. Accordingly when the upper 24 and lower 26 housings are drawn together by thread forming fasteners 96, the ends of the fastener bosses 50 of the upper housing 24 are captured by the circular lips 92 of the fastener bosses 84 of the lower housing 26. The interlock feature of the invention significantly improves the structural integrity of the housing assembly 10 and facilitates assembly of the housings 24 and 26. Those having skill in the art will recognize that the tongue 90 can be included on the lower housing 26 as illustrated while the groove 58 is included on the upper 24 housing or vice versa. Likewise the circular lips 92 of the fastener bosses could be included on either of the upper 24 or lower 26 housing halves.

Figure 5:
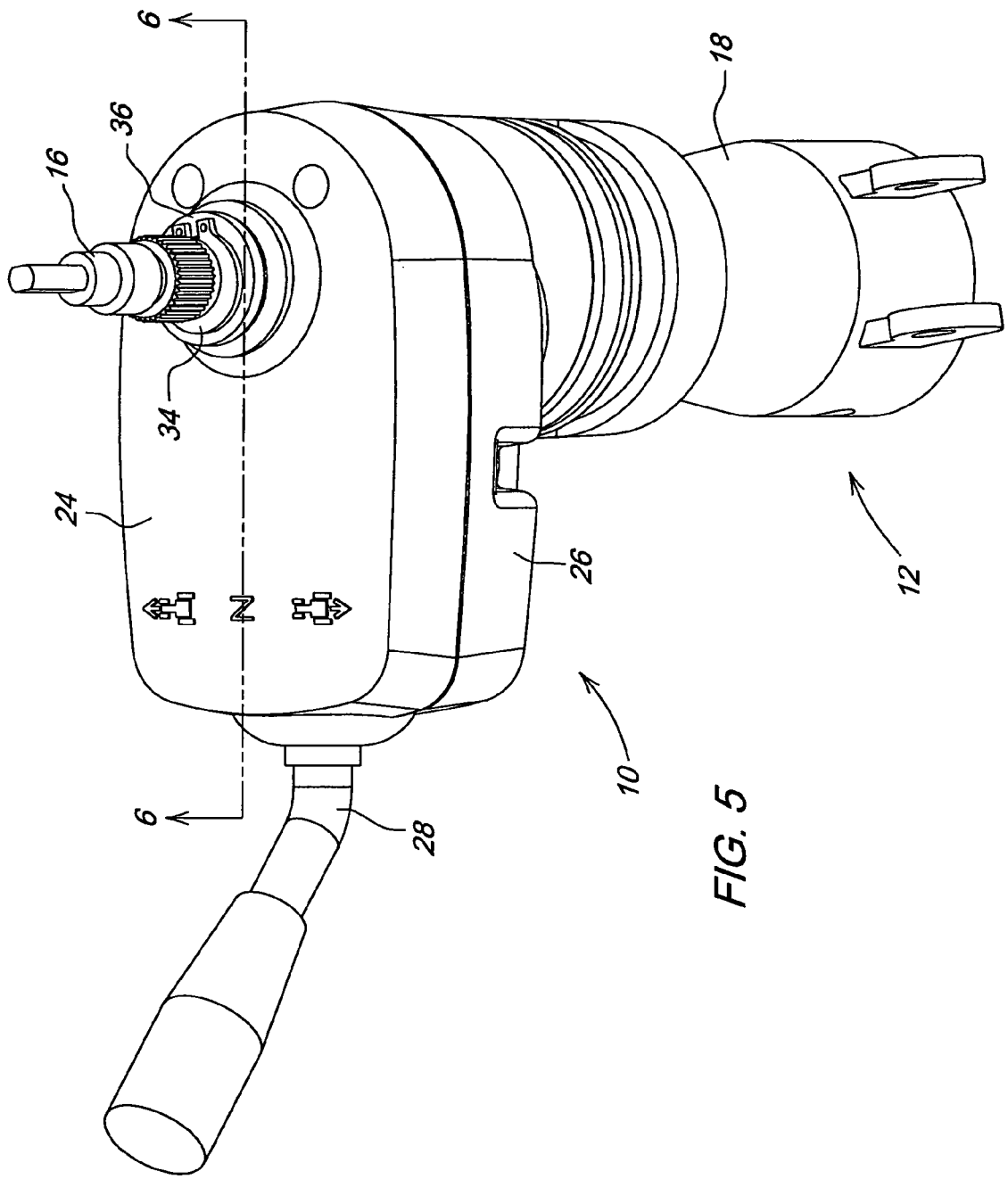
FIG. 5 is a perspective view of the control housing assembly of the invention.
Figure 6:
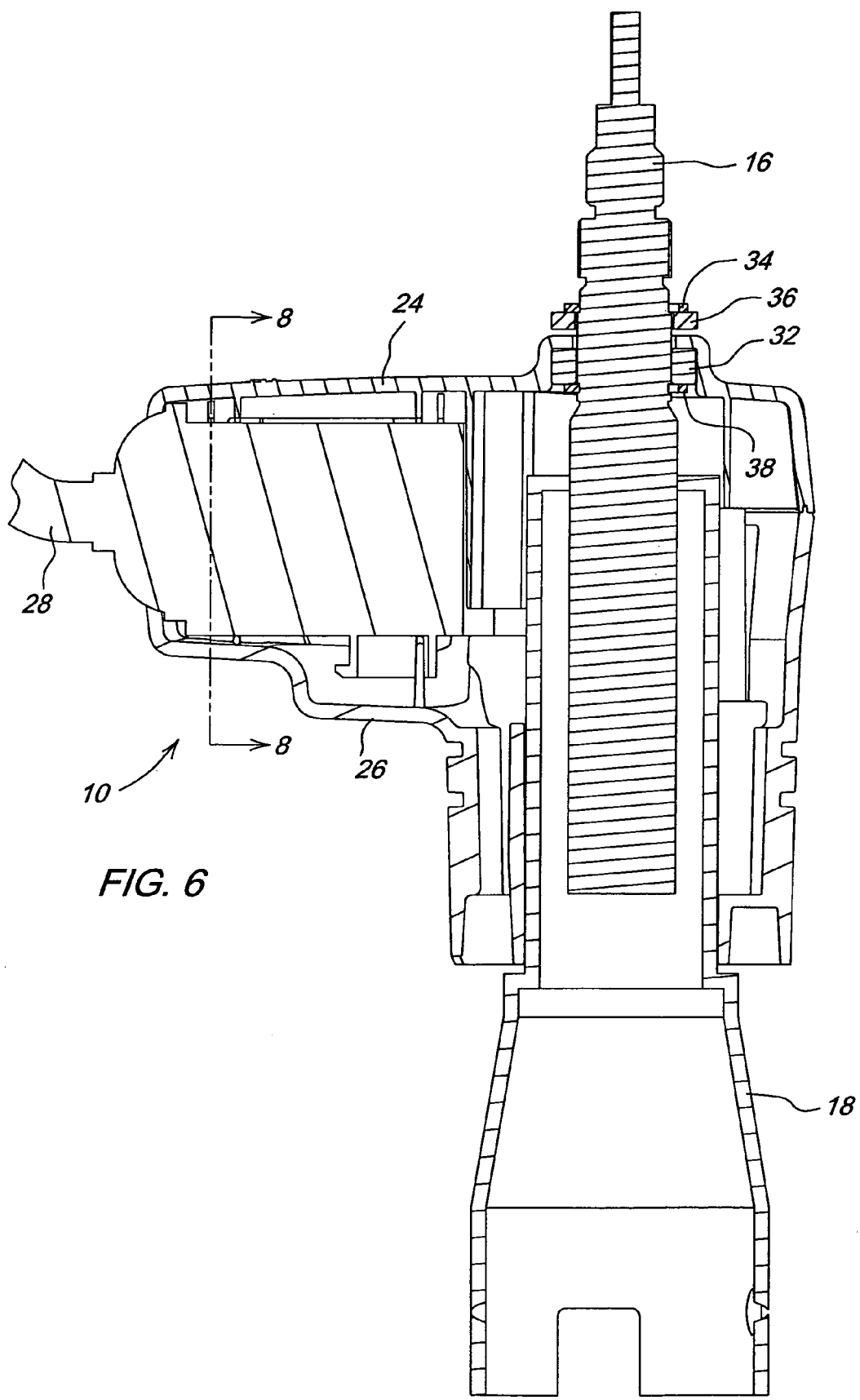
FIG. 6 is a cross-sectional view of the control housing assembly taken along the line 6—6 of FIG. 5.

FIGS. 5 and 6 illustrate how the housings are assembled to the steering column. As shown, the upper housing 24 is journaled on the steering shaft 16 by way of the bushing 32. The washer 36 and upper retaining clip 34 prevent the upper housing 24 from sliding up on the steering shaft 16, while the lower retaining clip 38 prevents the upper housing from falling down the shaft 16. The upper housing 24 is fixed from moving left, right, fore and aft by the bushing 32 and steering shaft 16 combination. The lower housing 26 is disposed over the steering shaft barrel 18 which is journaled in the column mounting portion 72 of the lower housing 26. Thus when the upper housing 24 and lower housing 26 are fastened together and mounted to the steering column the housing 10 moves up and down with the steering shaft 16 and relative to the steering barrel 18 as the steering column is telescoped and tilted. The key 30, mounted on the steering barrel 18, is disposed in the keyway 80 of the lower housing 26 and thus prevents the housing 10 from rotating on the steering column. As shown in FIG. 6 the LH FNR lever 28 is sandwiched between the upper housing 24 and the lower housing 26 and accordingly moves with the housing 10. Thus the LH FNR lever 28 is always located at the same position relative to the steering wheel 20 regardless of how the steering column is tilted or telescoped.

Figure 7:
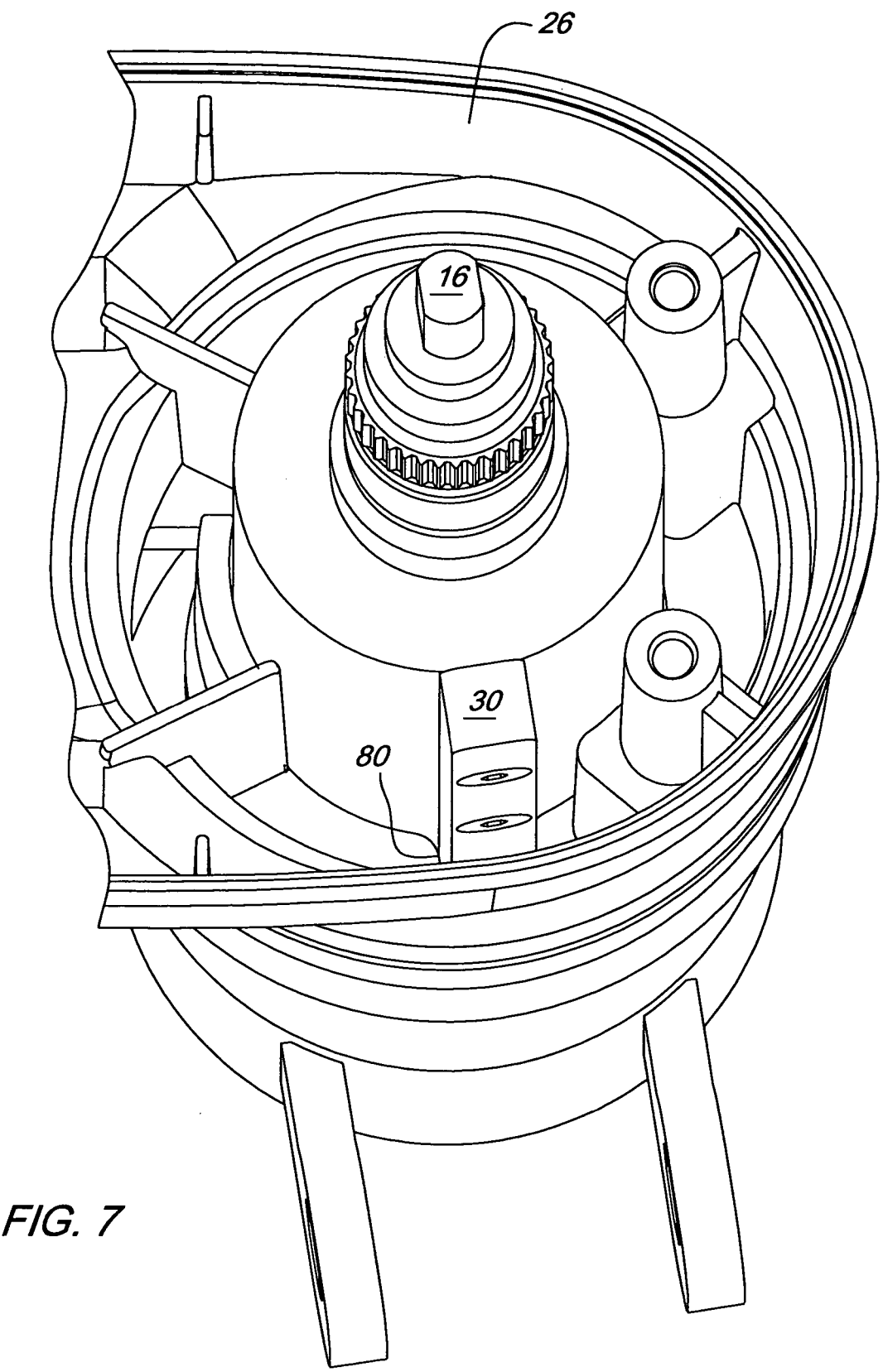
FIG. 7 is a perspective view of a portion of the control housing assembly without the upper housing.

With reference to FIG. 7 it can be seen that the lower housing 26 contacts the key 30 to prevent rotation, and the lower housing 26 contacts the steering column barrel 18 to prevent motion fore and aft and side to side. Both of these contacts are configured such that the control housing assembly 10 can move up and down.

Figure 9:
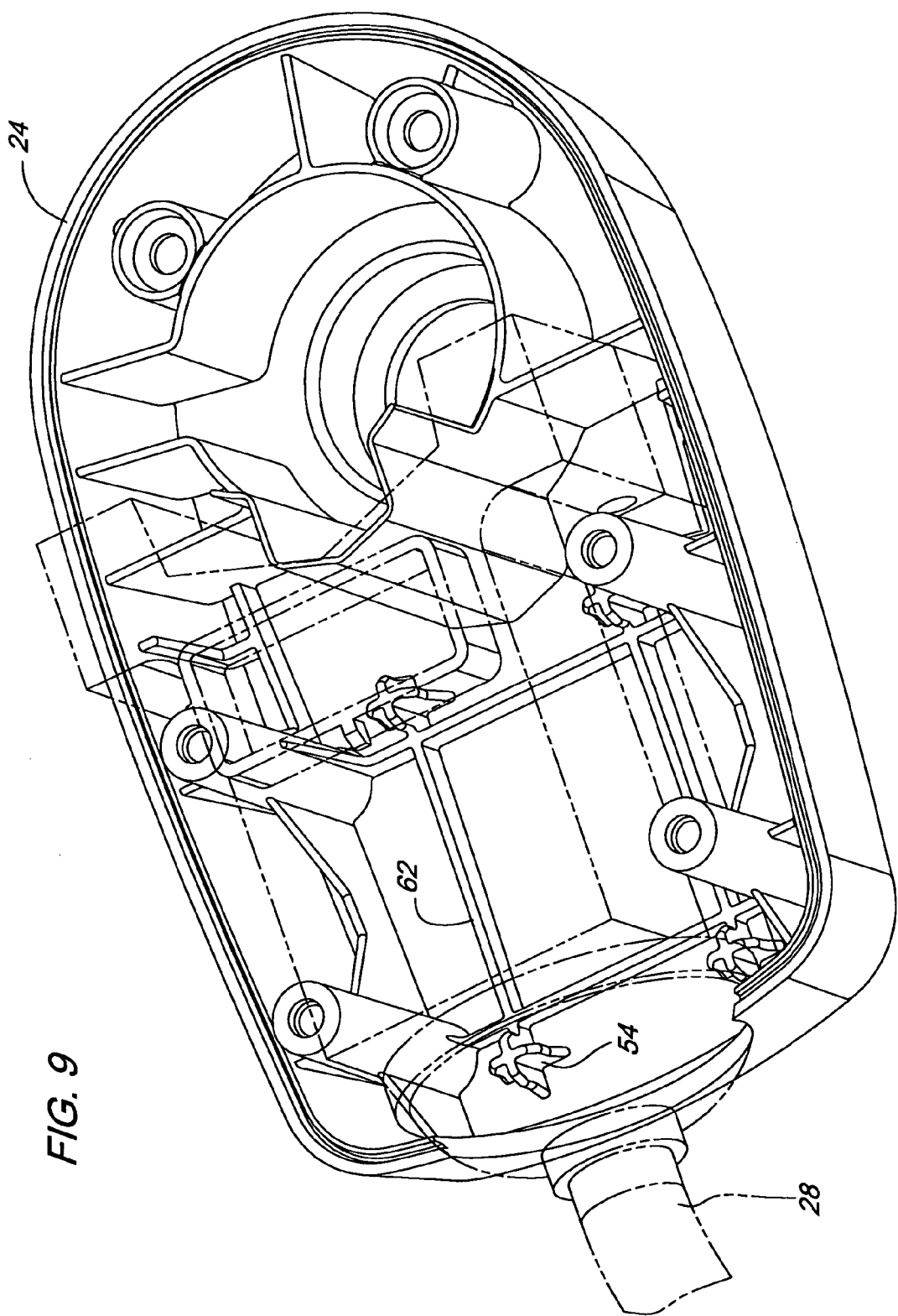
FIG. 9 is a perspective view of the upper housing with the control lever shown in phantom; and, FIG. 10 is a perspective view of the lower housing with the control lever shown in phantom.
Figure 10:
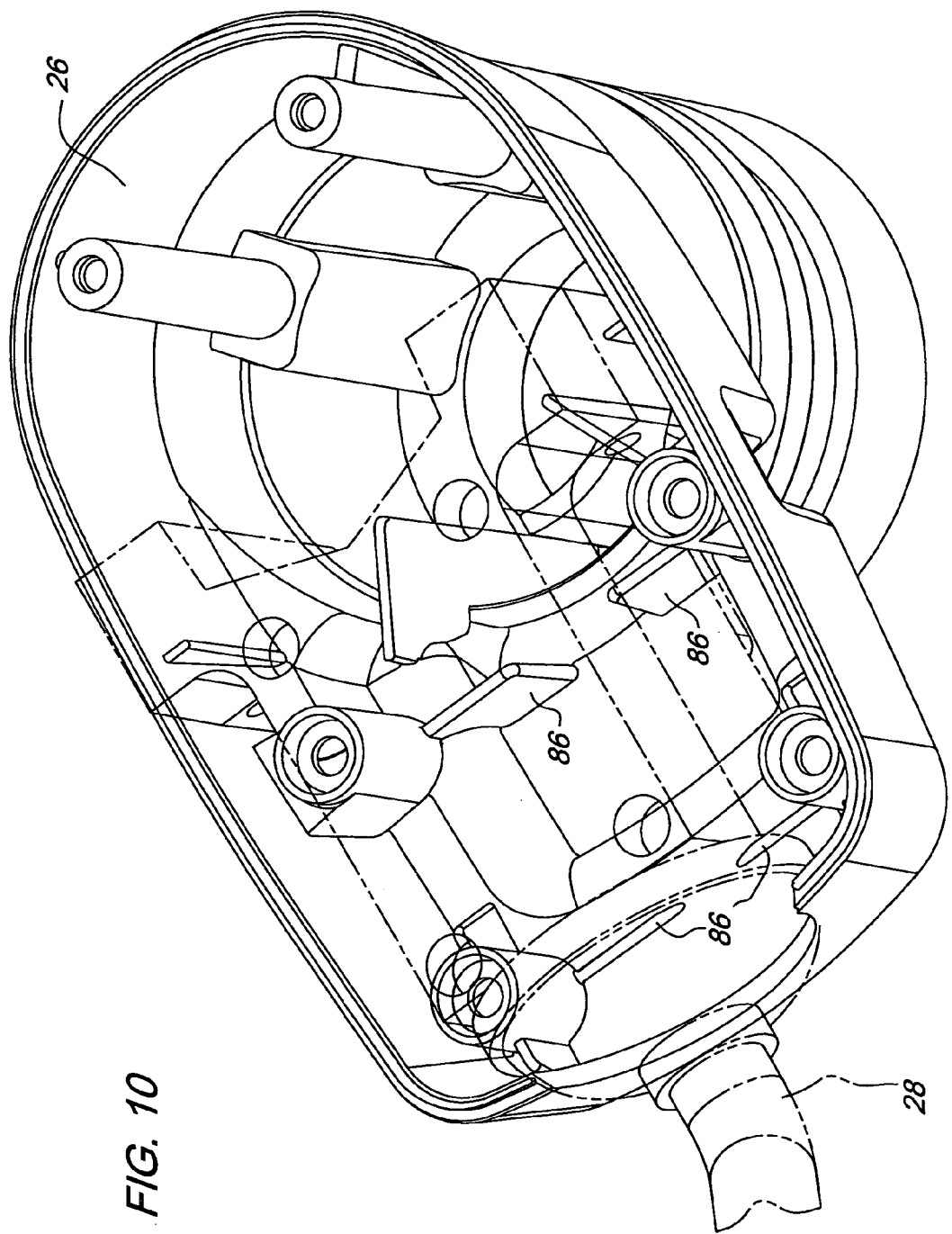

FIGS. 9 and 10 illustrate how the upper housing 24 and lower housing 26 contact the LH FNR lever 28. As can be seen the LH FNR lever 28 is "trapped" between the upper housing 24 and lower housing 26 with multiple contact points created by the various lever assembly bolsters 50 and 86 of the upper 24 and lower 26 housings respectively.

The upper housing 24 and lower housing 26 serve not only the structural functions of housing and supporting the LH FNR lever 28, but also no further outer housing or trim is required to serve the aesthetic functions of the housing. Because the housing 10 is preferably manufactured from a composite material that is both structurally strong and aesthetically pleasing it is possible to manufacture the housing 10 with a few number of parts and with less expense than previously known structures. The structural features of the housing 10 described above, permit loads applied to the LH FNR lever 28, to be transmitted to the housing 10 and, in turn, to the steering column.

The invention described herein is particularly well suited for use with an agricultural tractor equipped with a LH FNR lever and a tilting and telescoping steering control assembly in an operator's station thereof, but it will be recognized that the invention has equal application to other types of vehicles having other types of control levers, switches, or knobs and different types of steering control assembly configurations.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. An operator control housing for a work vehicle, the vehicle being equipped with a control lever and a steering column assembly, the steering column assembly having a steering shaft disposed in a steering shaft barrel and a steering wheel attached to the steering shaft, the control housing assembly comprising:
    a key mounted on the steering shaft barrel;
    a first housing half journaled on the steering shaft by way of bushing means for preventing the control housing from wearing prematurely as the steering wheel is turned and being retained thereon by at least one means for retaining, the first housing half having a plurality of lever support bolsters and a plurality of fastener bosses;
    a second housing half disposed on the steering shaft barrel, the second housing half having a plurality of lever support bolsters, a keyway and a plurality of fastener bosses;
    one of the first or second housing halves having a groove around a peripheral edge thereof, the other of the first or second housing halves having a tongue around a peripheral edge thereof;
    one of the first or second housing halves having a circular lip at an end of each fastener boss; and,
    wherein the keyway of the second housing half engages the key mounted on the steering shaft barrel so that the housing cannot rotate with respect thereto and the tongue of one housing half matingly engages the groove of the other housing half, the circular lips of the fastener bosses of one housing half engage the fastener bosses of the other housing half, the control lever is sandwiched between the first and second housing halves and is supported therein by the lever support bolsters of both housing halves so that loads are transmitted from the control lever to the housing assembly and in turn to the steering column assembly, the control housing assembly is able to move with the steering shaft and steering wheel but cannot rotate.

2. An operator control housing for a work vehicle according to claim 1 wherein the steering column assembly is adapted to tilt.

3. An operator control housing for a work vehicle according to claim 1 wherein the steering column assembly is adapted to telescope.

4. An operator control housing for a work vehicle according to claim 1 wherein the retaining means comprises an upper retaining ring and a lower retaining ring.

5. An operator control housing for a work vehicle according to claim 1 wherein the first housing half is an upper housing and has the tongue around the peripheral edge thereof.

6. An operator control housing for a work vehicle according to claim 1 wherein the first housing half is an upper housing and has the groove around the peripheral edge thereof.

7. An operator control housing for a work vehicle according to claim 1 wherein the first housing half is an upper housing and has the fastener bosses with the circular lip thereon.

8. An operator control housing for a work vehicle according to claim 6 wherein the second housing half is a lower housing and has the tongue around the peripheral edge thereof.

9. An operator control housing for a work vehicle according to claim 5 wherein the second housing half is a lower housing and has the groove around the peripheral edge thereof.

10. An operator control housing for a work vehicle according to claim 1 wherein the second housing half is a lower housing and has the fastener bosses with the circular lip thereon.

11. An operator control housing for a work vehicle according to claim 1 wherein the first housing half is an upper housing and has a bushing journal into which the bushing means is press fit.

12. An operator control housing for a work vehicle according to claim 1 wherein the control lever is a left hand forward-neutral-reverse lever.

13. An operator control housing for a work vehicle according to claim 1 wherein the steering shaft is slidable with respect to the steering shaft barrel so that the steering column assembly can be telescoped.

14. An operator control housing for a work vehicle according to claim 13 wherein the control housing and steering wheel are fixed to and move with the steering shaft when it is telescoped relative to the steering barrel.

15. An operator control housing for a work vehicle according to claim 1 wherein the first and second housing halves are manufactured from a composite material.

16. An operator control housing for a work vehicle according to claim 15 wherein at least one of the first or second housing halves has one or more support webs connecting two or more fastener bosses.

17. An operator control housing for a work vehicle according to claim 15 wherein at least one of the first or second housing halves has one or more support ridges connecting two or more lever support bolsters.

18. An operator control housing for a work vehicle according to claim 1 wherein the second housing half has a steering barrel journal therein.

19. An agricultural tractor having an operator's station, a steering column assembly mounted in the operator's station, the steering column assembly having a steering shaft disposed in a steering shaft barrel and a steering wheel attached to the steering shaft, the steering column assembly being adapted to both tilt and telescope, the tractor being further equipped with a left hand forward-neutral-reverse lever for controlling the forward and reverse motion of the tractor, the tractor further comprising:
    a key mounted on the steering shaft barrel;
    a first housing half journaled on the steering shaft by way of a bushing and being retained thereon by at least one retaining ring, the first housing half having a plurality of lever support bolsters and a plurality of fastener bosses;
    a second housing half disposed on the steering shaft barrel, the second housing half having a plurality of lever support bolsters, a keyway and a plurality of fastener bosses;
    one of the first or second housing halves having a groove around a peripheral edge thereof, the other of the first or second housing halves having a tongue around a peripheral edge thereof;
    one of the first or second housing halves having a circular lip at an end of each fastener boss; and, wherein the keyway of the second housing half engages the key mounted on the steering barrel so that the housing cannot rotate with respect thereto and the tongue of one housing half matingly engages the groove of the other housing half, the circular lips of the fastener bosses of one housing half engage the fastener bosses of the other housing half, the left hand forward-neutral-reverse lever is sandwiched between the upper and lower housings and is supported therein by the lever support bolsters of both housing halves so that loads are transmitted from the left hand forward-neutral-reverse lever to the housing assembly and in turn to the steering column assembly, the control housing assembly is able to move with the steering shaft and steering wheel as the steering shaft and steering wheel are telescoped and tilted but cannot rotate.

20. An agricultural tractor according to claim 19 wherein the first housing half is an upper housing and has the tongue around the peripheral edge thereof.

21. An agricultural tractor according to claim 19 wherein the first housing half is an upper housing and has the groove around the peripheral edge thereof.

22. An agricultural tractor according to claim 19 wherein the first housing half is an upper housing and has the fastener bosses with the circular lip thereon.

23. An agricultural tractor according to claim 21 wherein the second housing half is a lower housing and has the tongue around the peripheral edge thereof.

24. An agricultural tractor according to claim 20 wherein the second housing half is a lower housing and has the groove around the peripheral edge thereof.

25. An agricultural tractor according to claim 19 wherein the second housing half is a lower housing and has the fastener bosses with the circular lip thereon.

26. An agricultural tractor according to claim 19 wherein the first housing half is an upper housing and has a bushing journal into which the bushing is press fit.

27. An agricultural tractor according to claim 19 wherein the steering shaft is slidable with respect to the to the steering shaft barrel so that the steering column assembly can be telescoped.

28. An agricultural tractor according to claim 19 wherein the first and second housing halves are manufactured from a composite material.

29. An agricultural tractor according to claim 28 wherein at least one of the first or second housing halves has one or more support webs connecting two or more fastener bosses.

30. An agricultural tractor according to claim 28 wherein at least one of the first or second housing halves has one or more support ridges connecting two or more lever support bolsters.

31. An agricultural tractor according to claim 19 wherein the second housing half has a steering barrel journal therein.

* * * * *